United States Patent
Neumann et al.

(10) Patent No.: US 10,882,038 B2
(45) Date of Patent: Jan. 5, 2021

(54) ALUMINUM-DOPED, IMINOACETIC ACID GROUP-CONTAINING CHELATE RESINS

(71) Applicant: LANXESS Deutschland GmbH, Cologne (DE)

(72) Inventors: Stefan Neumann, Leverkusen (DE); Bernd Koop, Cologne (DE); Jenny Barbier, Cologne (DE); Reinhold Klipper, Cologne (DE)

(73) Assignee: LANXESS Deutschland GmbH, Cologne (DE)

( * ) Notice: Subject to any disclaimer, the term of this patent is extended or adjusted under 35 U.S.C. 154(b) by 216 days.

(21) Appl. No.: 15/743,873

(22) PCT Filed: Jul. 19, 2016

(86) PCT No.: PCT/EP2016/067167
§ 371 (c)(1),
(2) Date: Jan. 11, 2018

(87) PCT Pub. No.: WO2017/013110
PCT Pub. Date: Jan. 26, 2017

(65) Prior Publication Data
US 2018/0200709 A1    Jul. 19, 2018

(30) Foreign Application Priority Data

Jul. 20, 2015 (EP) .................................. 15177431
Jul. 21, 2015 (EP) .................................. 15177646

(51) Int. Cl.
| | | |
|---|---|---|
| *B01D 15/08* | (2006.01) |
| *B01J 39/18* | (2017.01) |
| *B01J 45/00* | (2006.01) |
| *C02F 1/58* | (2006.01) |
| *C08F 8/10* | (2006.01) |
| *C08F 8/12* | (2006.01) |
| *C08F 8/30* | (2006.01) |
| *C08F 8/44* | (2006.01) |
| *C08F 212/08* | (2006.01) |
| *C08F 212/36* | (2006.01) |
| *C08L 25/02* | (2006.01) |
| *C02F 1/28* | (2006.01) |

(52) U.S. Cl.
CPC .............. *B01J 39/18* (2013.01); *B01D 15/08* (2013.01); *B01J 45/00* (2013.01); *C02F 1/285* (2013.01); *C02F 1/583* (2013.01); *C08F 8/10* (2013.01); *C08F 8/12* (2013.01); *C08F 8/30* (2013.01); *C08F 8/44* (2013.01); *C08F 212/08* (2013.01); *C08F 212/36* (2013.01); *C08F 2800/20* (2013.01); *C08L 25/02* (2013.01); *Y02W 10/37* (2015.05)

(58) Field of Classification Search
CPC . B01J 39/18; B01J 45/00; C02F 1/285; C02F 1/583; C08F 8/10; C08F 8/12; C08F 8/30; C08F 8/44; C08F 2800/20; C08F 212/08; C08F 212/36; C08L 25/02; B01D 15/08; Y02W 10/37
See application file for complete search history.

(56) References Cited

U.S. PATENT DOCUMENTS

| 4,427,794 A | 1/1984 | Lange et al. |
| 6,610,753 B2 | 8/2003 | Luetjens et al. |
| 8,399,528 B2 | 3/2013 | Klipper et al. |
| 8,562,922 B2 | 10/2013 | Klipper et al. |
| 2006/0273014 A1 | 12/2006 | Klipper et al. |
| 2009/0158896 A1 | 6/2009 | Rossoni et al. |

FOREIGN PATENT DOCUMENTS

| DE | 2807124 A1 | 7/1979 |
| DE | 3004058 A1 | 9/1981 |
| DE | 3129473 A1 | 2/1983 |

OTHER PUBLICATIONS

Bulusu, K., et al., "Defluoridation of waters using combination of aluminum chloride and aluminum sulfate", J. Inst. Eng., India, 65, Part EN1, 22. (Year: 1984).*
Sowmya, A., and S. Meenakshi, "Phosphate uptake studies on different types of lanthanum-loaded polymeric materials", Environmental Progress and Sustainable Energy, 34, 1, pp. 146-154 (Year: 2015).*
Prabhu, Subbaiah Muthu, et al., "Effect of metal ions loaded onto iminodiacetic acid functionalized cation exchange resin for selective fluoride removal", available from the Internet at www.deswater. com, 52 (2014) March, Taylor & Francis, pp. 2527-2536.
Loganathan, Paripurnanda, et al., "Delfuoridation of drinking water using adsorption processes", Journal of Hazardous Materials 248-249 (2013), Elsevier, pp. 1-19.
International Search Report from corresponding International Application No. PCT/EP2016/067167, dated Sep. 19, 2016, three pages.
Luo, F., et al., The Removal of Fluoride Ion by Using Metal(III)-Loaded Amberlite Resins, Solvent Extraction and Ion Exchange, vol. 22, No. 22, 2004, Marcel Dekker Inc., pp. 305-322.

* cited by examiner

*Primary Examiner* — Benjamin L Lebron
(74) *Attorney, Agent, or Firm* — Nicanor A. Kohncke; Christopher L. McDavid

(57) ABSTRACT

The present invention relates to aluminium-doped chelate resins containing iminoacetic acid groups, to a production process for aluminium-doped chelate resins containing iminoacetic acid groups, and to a device comprising at least one layer of at least one aluminium-doped chelate resin containing iminoacetic acid groups, and to the uses of this device and of the chelate resins for removal of fluoride from water.

14 Claims, No Drawings

ALUMINUM-DOPED, IMINOACETIC ACID GROUP-CONTAINING CHELATE RESINS

The present invention relates to aluminium-doped chelate resins containing iminoacetic add groups, to a production process for aluminium-doped chelate resins containing iminoacetic acid groups, to a device comprising at least one layer of at least one aluminium-doped chelate resin containing iminoacetic acid groups, and to the uses of this device and of the chelate resins for removal of fluoride from water.

Fluoride is a trace element which is ubiquitous in our environment. Moreover, it occurs as a waste product in the industrial production of ceramics or porcelain or in the semiconductor and solar industries. Because of the existing production processes, it is frequently disposed of with the wastewater. Natural deposits can likewise lead to pollution of the water by fluoride.

The removal of fluoride from water becomes necessary when the water has too high a fluoride concentration. Although fluoride is an important trace element to man and serves to strengthen the bones and teeth, it has toxic properties in the case of elevated absorption over a prolonged period and can lead to bone and tooth diseases such as osteosclerosis or fluorosis. There is also the suspicion of carcinogenicity. In Germany, according to drinking water regulations, fluoride ions may be present up to a concentration of 1.5 ppm (mg/l) in drinking water. The guideline value of the World Health Organization (WHO) for fluoride in drinking water is also 1.5 ppm (mg/l).

Conventional methods of removing fluoride from wastewater, such as the precipitation by addition of calcium chloride known from DE-A 2801724 or the adsorption of fluoride on activated alumina known from DE-A 3004058, are suitable only to a limited degree, if at all, for drinking water treatment. Our experience has shown that it is possible by precipitation, even with considerable excesses of precipitant, to attain only concentrations of 3 to 10 ppm fluoride, which is still well above the required limit of 1.5 ppm. The adsorption of fluoride on activated alumina is likewise unsuitable for drinking water treatment, since the capacities are very sensitive to the water composition. Moreover, the pH of the water released is affected and the aluminium oxide grains of the activated alumina release aluminium to the water treated, which means that the aluminium limit of 0.2 ppm required in the German drinking water regulations can easily be exceeded.

A further method of removing fluorides from water, in which the fluorides are precipitated with the aid of sodium aluminate, is known from DE-A 3129473. A disadvantage of this method is likewise that the water still has excessively high fluoride concentrations.

In addition, "Solvent Extraction and Ion Exchanger", vol. 22, no. 2, pp. 305-322, 2004, discloses aluminium-doped amberlite resins which are utilized for fluoride removal but have the disadvantage of likewise releasing excessively high amounts of aluminium ions and have too low a fluoride absorption capacity.

A feature common to the known chelate resins is that their fluoride capacities are too low and they cannot therefore be used efficiently. In addition, they can contain toxic substances. There was therefore still a need for a chelate resin for fluoride removal, with which the disadvantages of the prior art are overcome.

It has now been found that, surprisingly, aluminium-doped chelate resins having iminoacetic acid groups have a particularly high fluoride capacity when their second substitution level is within a range between 0.70 and 1.20.

The invention therefore provides a chelate resin containing functional groups of the formula (I)

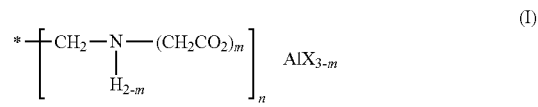

which are bonded to the polymer skeleton of the chelate resin via the methylene group via an aromatic radical, where the polymer skeleton has been prepared from monovinylaromatic and polyvinylaromatic monomers and X is any monovalent anion, with n=0.60 to 1.50 per aromatic radical and m=0.70 to 1.20 per nitrogen atom.

X may be, for example, nitrate, nitride, hydrogensulphate, hydrogencarbonate or a halide, for example and with preference chloride and bromide. X is preferably chloride.

Preference is given to using a polystyrene copolymer skeleton as the polymer skeleton. Particular preference is given to using a styrene/divinylbenzene-crosslinked copolymer as the polystyrene copolymer skeleton.

In addition, the invention encompasses a production process for the chelate resins of the invention containing functional groups of the formula (I), in which
a.) monomer droplets composed of at least one monovinylaromatic compound and at least one polyvinylaromatic compound and at least one porogen and at least one initiator are converted to a crosslinked bead polymer,
b.) the crosslinked bead polymer from step a) is phthailmidomethylated with phthalimide derivatives and the phthalimide derivative is used in this reaction in a ratio of 0.70 mol to 1.70 mol per mole of bead polymer,
c.) the phthalimidomethylated bead polymer from step b) is converted to aminomethylated bead polymer and
d.) the aminomethylated bead polymer from step c) is reacted with chloroacetic acid or salts thereof to give chelate resins having iminoacetic acid groups with m=0.70 to 1.20 and the molar ratio of chloroacetic acid or salts thereof is 0.70:1 to 1.40:1 based on the molar amount of the aminomethyl groups in the bead polymer and
e.) the chelate resin from step d) is contacted with a solution of $AlX_3$ where X is any monovalent anion.

The scope of the invention encompasses all parameters and elucidations above and detailed hereinafter, in general terms or within areas of preference, together with one another, i.e. including any combinations between the respective areas and areas of preference.

When reference is made later on in the text to aluminium-doped chelate resins containing iminoacetic acid groups, these correspond to the aluminium-doped chelate resins of the invention containing functional groups of the formula (I).

For the purposes of the present invention, monovinylaromatic compounds (monomers) used in process step a) are preferably styrene, vinyltoluene, ethylstyrene, α-methylstyrene, chlorostyrene, chloromethylstyrene. Particular preference is given to styrene.

It is especially preferable to use styrene or mixtures of styrene with the abovementioned monomers, preferably with ethylstyrene.

Preferred polyvinylaromatic compounds (crosslinkers) in the context of the present invention for process step a) are divinylbenzene, divinyltoluene, trivinylbenzene, divinylnaphthalene, trivinylnaphthalene, more preferably divinylbenzene.

The polyvinylaromatic compounds are preferably used in amounts of 1%-20% by weight, more preferably 2%-12% by weight, especially preferably 4%-10% by weight, based on the sum total of monomer(s) and crosslinker(s). The nature of the polyvinylaromatic compounds (crosslinkers) is selected with regard to the subsequent use of the polymer beads. In the case of use of divinylbenzene, commercial qualities of divinylbenzene also comprising ethylvinylbenzene as well as the isomers of divinylbenzene are adequate. A preferred embodiment of the present invention employs microencapsulated monomer droplets in process step a).

Useful materials for the microencapsulation of the monomer droplets are those known for use as complex coacervates, especially polyesters, natural and synthetic polyamides, polyurethanes or polyureas.

Gelatin is a natural polyamide used with preference. Gelatin is especially employed in the form of coacervate and complex coacervate. For the purposes of the invention, gelatin-containing complex coacervates are, in particular, combinations of gelatin with synthetic polyelectrolytes. Suitable synthetic polyelectrolytes are copolymers incorporating units of, for example, maleic acid, acrylic acid, methacrylic acid, acrylamide and methacrylamide. Particular preference is given to using acrylic acid and acrylamide. Gelatin-containing capsules can be hardened with conventional hardeners, for example formaldehyde or glutaraldehyde. The encapsulation of monomer droplets with gelatin, gelatin-containing coacervates and gelatin-containing complex coacervates is described in detail in EP-A 0 046 535. The methods for encapsulation with synthetic polymers are known. Preference is given to phase interfacial condensation, in which a reactive component dissolved in the monomer droplet (especially an isocyanate or an acid chloride) is reacted with a second reactive component dissolved in the aqueous phase (especially an amine).

The optionally microencapsulated monomer droplets contain at least one initiator or mixtures of initiators to induce the polymerization. Initiators preferred for the process according to the invention are peroxy compounds, especially preferably dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexanoate, 2,5-bis(2-ethythexanoylperoxy)-2,5-dimethylhexane or tert-amylperoxy-2-ethylhexane, and also azo compounds such as 2,2'-azobis(isobutyronitrile) or 2,2'-azobis(2-methylisobutyronitrile).

The initiators are preferably used in amounts of 0.05% to 2.5% by weight, more preferably 0.1% to 1.5% by weight, based on the monomer mixture.

Preference is given to using porogens in order to produce a macroporous structure in the polymer beads. Suitable porogens include organic solvents that are soluble in the monomer mixture but are poor solvents and/or swellants for the polymer formed. Examples of these are hexane, octane, isooctane, isododecane or octanol and isomers thereof.

The performance of process step a) s sufficiently well known to those skilled in the art, for example from EP-A 2305382.

According to the present invention, the bead polymers from process step a) may be obtained either in heterodisperse particle size distribution or in monodisperse particle size distribution.

A monodisperse crosslinked bead polymer is obtained in process step a) by conducting the conversion in process step a) by the jetting method or by the seed/feed method. Both process steps are known from the prior art and are described, for example, in EP-A 2259874. The disclosure for these two steps from EP-A 2259874 is incorporated into the present description via the reference to this application.

In the present application, monodisperse materials are those in which at least 90% by volume or % by mass of the particles have a diameter within ±10% of the most common diameter.

For example, in the case of a material having a most common diameter of 0.5 mm, at least 90% by volume or % by mass is within a size range between 0.45 mm and 0.55 mm; in the case of a material having a most common diameter of 0.7 mm, at least 90% by volume or % by mass is within a size range between 0.77 mm and 0.63 mm.

Process step b) can be conducted, for example, by first preparing the amidomethylating reagent and then adding it to the bead polymer from process step a). Process step b), however, can likewise be conducted in the form of a one-pot reaction in which the bead polymer from process step a) is reacted with a phthalimide derivative and a condensed formaldehyde, for example and with preference paraformaldehyde.

Preferably, process step b) is conducted by first preparing the amidomethylating reagent and then adding it to the bead polymer from process step a).

In a preferred embodiment of the present invention, the amidomethylating reagent is prepared in such a way that a phthalimide derivative is dissolved in a solvent and admixed with formalin. Subsequently, a bis(phthalimido) ether is then formed from this mixture, with elimination of water. Where appropriate, the bis(phthalimido) ether can be converted to the phthalimido ester. Preference is given to using the bis(phthalimido) ether. Preferred phthalimide derivatives in the context of the present invention are phthalimide or substituted phthalimides, for example and with preference methylphthalimide. Particular preference is given to using phthalimide as phthalimide derivative.

The molar ratio of the phthalimide derivatives to the bead polymers in process step b) is 0.70:1 to 1.70:1. Preferably, the phthalimide derivative is used in a molar ratio of 0.70:1 to 1.35:1 in process step b). Most preferably, 0.80 mol to 1.1 mol of phthalimide derivative is used per mole of bead polymer in process step b).

Formalin is typically used in excess based on phthalimide derivative, but it is also possible to use different amounts. Preference is given to using 1.01 to 1.20 mol of formalin per mole of phthalimide derivative. Very particular preference is given to using 1.03 to 1.07 mol of formalin per mole of phthalimide derivative.

Solvents used in step b) of the process are inert solvents suitable for swelling the polymer, preferably chlorinated hydrocarbons, more preferably dichloroethane or methylene chloride. However, it is also conceivable that no solvent or swellant is used in process step b). In process step b), the bead polymer is condensed with phthalimide derivatives. The catalyst used here is oleum, sulphuric acid or sulphur trioxide, in order to prepare an $SO_3$ adduct of the phthalimide derivative in the inert solvent therefrom. In process step b), the catalyst is typically added in deficiency relative to the phthalimide derivative, although it is also possible to use greater amounts. Preferably, the molar ratio of the catalyst to the phthalimide derivatives is between 0.1:1 and 0.45:1. More preferably, the molar ratio of the catalyst to the phthalimide derivatives is between 0.2:1 and 0.4:1.

The temperature on addition of the catalyst to the bead polymer and the $SO_3$ adduct of the phthalimide derivative should preferably be below <45° C., more preferably between 5 to 30° C.

Process step b) can be conducted at a wide variety of different temperatures depending on the solvent. In general, the reaction is conducted at 40° C. to 80° C., but it is likewise possible to choose other temperatures. Preferably, process step b) is conducted at 60° C. to 80° C. Typically, the mixture is stirred for 1 to 15 hours. However, the mixture can also be stirred for a longer or shorter period. Preferably, the reaction in process step b) is stirred for 6 to 10 hours.

The process according to the invention can achieve any first substitution level $n=0.60$ to 1.50 phthalimidomethyl groups. In the present application, first substitution level is understood to mean the mean number of phthalimidomethyl groups per aromatic radical, based on the sum total of the substituted and unsubstituted aromatic radicals. A first substitution level of $n=1.10$ means, for example, that 1 hydrogen atom on the aromatic radical has been replaced by a phthalimidomethyl group and that, in addition, every tenth aromatic radical has been disubstituted. Preferably, the first substitution level by phthalimidomethyl groups is between $n=0.60$ to 1.20 and more preferably between $n=0.70$ to 1.00.

The cleavage of the phthalic acid radical and thus the liberation of the aminomethyl group takes place in process step c) generally and preferably through treatment of the phthalimidomethylated crosslinked bead polymer with aqueous or alcoholic solutions of an alkali metal hydroxide, such as sodium hydroxide or potassium hydroxide, at temperatures of 100 to 250° C., preferably of 120 to 190° C. The concentration of the sodium hydroxide solution is in the range from 10% to 50% by weight, preferably from 20% to 40% by weight.

The resultant aminomethylated bead polymer is generally washed with demineralized water until free from alkali metal.

In process step d), the chelate resins of the invention are prepared by reacting the crosslinked vinylaromatic bead polymer containing aminomethyl groups in aqueous suspension with chloroacetic acid or salts thereof, for example and with preference the lithium, sodium, potassium, calcium and magnesium salts. An especially preferred chloroacetic acid salt is the sodium salt of chloroacetic acid.

The sodium salt of chloroacetic acid is preferably used as an aqueous solution. Particular preference is given to using an aqueous chloroacetic acid with 60% by weight to 85% by weight.

The aqueous solution of the sodium salt of chloroacetic acid or the aqueous chloroacetic acid is generally metered into the initially charged aqueous suspension of the bead polymer containing aminomethyl groups at the reaction temperature within 0.5 to 15 hours. Preference is given to metered addition within 5 to 11 hours.

The hydrochloric acid released in the reaction of the bead polymers containing aminomethyl groups with chloroacetic acid is generally partly or fully neutralized by addition of sodium hydroxide solution, such that the pH of the aqueous suspension in this reaction is set within the range between pH 7 to 11.5. Preferably, the reaction is conducted at pH 8 to 10.

Process step d) is typically conducted at temperatures in the range between 50° C. and 100° C. However, it is also possible to choose temperatures outside this range. Preference is given to effecting the reaction at temperatures in the range between 80° C. and 95° C.

Preferably, the molar ratio of the chloroacetic acid derivative to the bead polymer containing aminomethyl groups is 0.80:1.0 to 1.1:1.0, based on the molar amount of the aminomethyl groups in the bead polymer when a second substitution level between $m=0.75$ and 0.95 is achieved.

The suspension medium used is water or aqueous salt solution. Useful salts include alkali metal salts, especially NaCl and sodium sulphate.

The reaction can achieve any second substitution level between $m=0.50$ and 2.00 based on the hydrogen atoms in the amino groups that have been replaced by acetic acid groups. A second substitution level of $m=1.50$ means, for example, that, statistically, both hydrogen atoms only in every second amino group have been replaced by acetic acid groups. In the present application, second substitution level is understood to mean the mean number of acetic acid groups which have been introduced per amino group, based on the sum total of the substituted and unsubstituted amino groups. The second substitution level of the amino group by acetic acid groups in the present invention is between $m=0.70$ to 1.20, the second substitution level preferably being between $m=0.75$ and 0.95.

In process step e), the chelate resins of the invention are doped by reaction with aluminium salt solutions to prepare the aluminium-doped chelate resin of the invention containing iminoacetic acid groups. Suitable aluminium salt solutions used may be any solutions of trivalent aluminium salts. In general, salts of trivalent aluminium with strong acids are used, for example aluminium chloride, aluminium nitrate, aluminium sulphate, aluminium bromide or aluminium iodide, or the hydrates and solvates thereof. The aforementioned chloride, nitride, bromide and iodide anions of the aluminium salts and anhydrates and solvates thereof are also preferred anions X in the functional groups of the formula (I). Preference is given to using aluminium chloride to dope the chelate resins containing iminoacetic acid groups. Preference is given to using water as solvent for the aluminium salts. Preference is given to using aqueous solutions.

The amount of aluminium used for doping is generally between 2 to 7 mol of aluminium, based on one litre of chelate resin containing iminoacetic acid groups used. However, the amount of aluminium ions used may also be outside this range. Preferably, the amount of aluminium used for doping is between 5 to 7 mol per litre of chelate resin containing iminoacetic acid groups used.

The chelate resin of the invention containing functional groups of the formula (I) is particularly suitable for removal of fluoride from water.

The chelate resins of the invention containing functional groups of the formula (I) may contain different amounts of aluminium. In general, the chelate resins containing functional groups of the formula (I) contain 10 to 50 grams of aluminium per litre of resin. Preferably, the chelate resins containing functional groups of the formula (I) contain 25 to 35 grams of aluminium per litre of resin.

The fluoride capacity of the chelate resin containing functional groups of the formula (I) is generally and preferably between 1 and 30 g per litre of chelate resin used.

The invention likewise encompasses a chelate resin containing functional groups of the formula (I) with $n=0.60$ to 1.20 and $m=0.70$ to 1.20, which has been prepared by a) converting monomer droplets composed of at least one monovinylaromatic compound and at least one polyvinylaromatic compound and at least one porogen and at least one initiator to a crosslinked bead polymer, b) phthalimidomethylating the crosslinked bead polymer from step a) with phthalimide derivatives and using the phthalimide derivative in this reaction in a ratio of 0.70 mol to 1.35 mol per mole of bead polymer, c) converting the phthalimidomethylated bead polymer from step b) to aminomethylated bead polymer, d.) reacting the aminomethylated bead polymer from step c) with chloroacetic acid or salts thereof to give chelate resins having iminoacetic acid groups with a second substitution level m=0.70 to 1.20, the molar ratio of chloroacetic acid or salts thereof being 0.70:1 to 1.40:1 based on the molar amount of the aminomethyl groups in the bead polymer, and e.) contacting the chelate resin containing iminoacetic acid groups from step d) with a solution of $AlX_3$ where X is any monovalent anion.

Preference is given to chelate resins containing functional groups of the formula (I) with n=0.70 to 1.0 and m=0.70 to 1.20, which are prepared by a) converting monomer droplets composed of at least one monovinylaromatic compound and at least one polyvinylaromatic compound and at least one porogen and at least one initiator to a crosslinked bead polymer, b) phthalimidomethylating the crosslinked bead polymer from step a) with phthalimide derivatives and using the phthalimide derivative in this reaction in a ratio of 0.80 mol to 1.1 mol per mole of bead polymer, c) converting the phthalimidomethylated bead polymer from step b) to aminomethylated bead polymer, d.) reacting the aminomethylated bead polymer from step c) with chloroacetic acid or salts thereof to give chelate resins having iminoacetic acid groups with a second substitution level m=0.70 to 1.20, the molar ratio of chloroacetic acid or salts thereof being 0.70:1 to 1.40:1 based on the amount of the aminomethylated bead polymer used, and e.) contacting the chelate resin containing iminoacetic acid groups from step d) with a solution of $AlX_3$ where X is any monovalent anion.

Preference is given to preparing monodisperse chelate resins having functional groups of the formula (I).

The invention is suitable for removing fluoride from water. Therefore, the invention additionally encompasses a device for removing fluoride from water, comprising at least one chelate resin containing functional groups of the formula (I).

The device could additionally include a further chelate resin containing iminoacetic acid groups which has been doped with calcium ions. Resins of this kind and the production thereof are known from the prior art. In the case of combination of two aluminium- or calcium-doped chelate resins containing iminoacetic acid groups, it is firstly possible to remove fluoride from the water and secondly to reduce the amount of toxic aluminium ions which is released to the water from the chelate resin containing functional groups of the formula (I).

Water in the context of the invention is preferably aqueous solutions, emulsions or mixtures of water and organic solvents. In the aqueous component of this water, the fluorides are in dissolved form. In general, the water contains an aqueous component of at least 10% by weight of water, based on the total amount of water. More preferably, the water according to the present invention contains at least 90% by weight of water, most preferably at least 99% by weight of water, based on the total amount of water.

Water which is to be purified in the context of the invention may also, for example, arise in the extraction of soil or be wastewater. In order to use this water for further purification in the process of the invention, preference is given to conducting a filtration before this water is purified with the chelate resins of the invention.

In general, the chelate resins of the invention are part of an ion exchange column. These columns are loaded with aqueous solutions containing fluoride by methods known to those skilled in the art.

The chelate resins of the invention are suitable for adsorption of fluoride ions from water. The chelate resins of the invention are especially suitable for removing fluoride from water for production of drinking water.

The removal of fluoride from water with the aid of the chelate resin of the invention can reduce the content of fluoride to below 1.5 ppm. In the context of the invention, therefore, the purification of water for production of drinking water means that the content of fluoride in the eluate of the chelate resin is reduced to values of less than 1.5 ppm.

Therefore, the invention likewise encompasses the use of the chelate resin for removal of fluoride from water, especially for production of drinking water.

The chelate resins of the invention have a particularly high affinity for fluoride ions and are therefore particularly suitable for removal of fluoride, especially at high salt contents (>10 meq/l), from water.

EXAMPLES

Example 1 a) Preparation of a Heterodisperse Macroporous Bead Polymer Based on Styrene and Divinylbenzene At room temperature, the reactor is initially charged with 1112 ml of demineralized water. Into this are metered 72 ml of a 2% by weight aqueous Walocel solution. Walocel (DOW Chemical) is a hydroxyethylmethylcellulose. The solution is prepared by introducing the hydroxyethylmethylcellulose solid into an initial charge of water while stirring and then stirring for a further 4 hours. After the aqueous Walocel solution has been metered in, the mixture is stirred for a further 30 minutes. Subsequently, 7.5 grams of disodium hydrogenphosphate*12 $H_2O$ are metered in. The mixture is stirred for a further 30 minutes.

With the stirrer stationary, the organic phase consisting of 865.1 g of styrene, 94.9 g of 80.95% by weight divinylbenzene, 576 g of isododecane and 7.68 g of 75% by weight dibenzoyl peroxide is metered in. The solution had been prepared separately beforehand.

The abovementioned mixture is polymerized to completion with stirring by increasing the temperature in accordance with a temperature programme beginning at 25° C. and ending at 95° C.

The mixture is cooled down, and the suspension is applied to a sieve, washed with demineralized water and dried in a laboratory vacuum cabinet at 80° C. for 48 hours.

Weight yield based on the total amount of monomers used: 957.2 grams b) Preparation of the Heterodisperse Amidomethylated Bead Polymer 666 ml of dichloroethane, 353.7 g of phthalimide and 204.5 g of 36% by weight formalin form an initial charge at room temperature. The pH of the suspension is adjusted to 5.5 to 6 using sodium hydroxide solution. The water is then removed by distillation. Then 25.9 g of sulphuric acid are metered in. The water formed is removed by distillation. The mixture is cooled. At 30° C., 94.7 g of 65% oleum and then 252.5 g of bead polymer prepared in accordance with process step a) from Example 1 are metered in. The suspension is heated to 70° C. and stirred at this temperature for a further 6.5 hours. The reaction liquid is drawn off, demineralized water is metered in and residual dichloroethane is removed by distillation.

Yield of amidomethylated bead polymer: 1100 ml c) Preparation of the Heterodisperse Aminomethylated Bead Polymer Into 1080 ml of amidomethylated bead polymer are metered 547 ml of demineralized water and 484.8 g of 50% by weight sodium hydroxide solution at room temperature. The suspension is heated to 180° C. and stirred at this temperature for 8 hours.

The resultant aminomethylated bead polymer is washed with demineralized water.

Yield of amidomethylated bead polymer: 835 ml

Amount of aminomethyl groups in mol per litre of aminomethylated bead polymer: 2.31 mol/l.

It can be calculated from this that, on statistical average, per aromatic nucleus, n=0.95 hydrogen atom has been replaced by aminomethyl groups.

d) Production of the Chelate Resin Having Chelating Groups of the Iminoacetic Acid Type Into 563 ml of demineralized water are metered, at room temperature, 805 ml of aminomethylated bead polymer from example 1c). The suspension is heated to 90° C. Into this suspension are metered, within 6 hours, 241.6 g of an aqueous solution having an 80% by weight content of monochloroacetic acid. At the same time, the pH of the suspension is kept at pH 9.2 by metered addition of 50% by weight sodium hydroxide solution. Subsequently, the mixture is heated to 95° C. and the suspension is adjusted to pH 10.5 with 50% by weight sodium hydroxide solution. The mixture is stirred at pH 10.5 and 95° C. for a further 6 hours.

Thereafter, the suspension is cooled. The resin is washed with demineralized water until it is free of chloride.

Yield: 1240 ml of chelate resin

Second substitution level: m=1.04

According to this, on statistical average, 1.04 of the two hydrogen atoms in the primary amino group have been replaced by acetic acid groups.

e) Doping of the Resins with Aluminium 110 ml of chelate resin from example d) are installed into a chromatography column having a frit base. A 1 litre beaker is initially charged with 550 ml of a 1 normal solution of $AlCl_3$ in demineralized water. By means of a peristaltic pump, the aluminium chloride solution is then pumped through the resin bed in downward flow and back into the beaker again for one hour. The rate of pumped circulation is 10 BV/h, i.e. 1.1 litre/h. The resin becomes laden with aluminium and shrinks by 10% in volume to 100 ml.

Thereafter, the aluminium chloride solution is discarded and 1 litre of deionized water is introduced into the beaker. The deionized water is conveyed through the resin into the eluate at a pumping rate of 1 litre per hour (10 BV/h). The deionized water rinses excess aluminium off the chelate resin. Thereafter, the material is ready for operation.

Resin volume: 100 ml 100 ml of resin contain 3.2 grams of aluminium.

f) Fluoride Adsorption Experiment on an Aluminium-Doped Resin 100 ml of the aluminium-doped resin from Example 1 e) in the abovementioned chromatography column, for downward flow operation, are connected at the feed via a pump to a 200 litre reservoir vessel and at the drain to a 200 litre collecting vessel.

The 200 litre feed vessel is initially charged with 200 litres of demineralized water and 28 g of $CaCl_2$, 53 g of $Na_2SO_4 \cdot 6H_2O$, 100 g of NaCl and 4.4 g of NaF are dissolved therein. The resulting composition of the solution is shown in Table 1.

TABLE 1

| Composition of the feed solution | | |
|---|---|---|
| Ion | Concentration [ppm] | Concentration [meq/l] |
| Calcium | 51 | 2.54 |
| Sodium | 257 | 11.17 |
| Chloride | 393 | 11.09 |
| Sulphate | 102 | 2.13 |
| Fluoride | 10 | 0.53 |
| Total | 813 | 27.46 |

At regular time intervals, the fluoride concentrations are measured in the eluate. The volume of filtrate in which an eluate concentration of <1.5 mg/l is measured is used to calculate, via mass balancing, the usable capacity (UC) reported as the mass of fluoride separated out (in g) per litre of chelate exchanger (in the aluminium form initially charged).

The usable capacity is 2.1 g of fluoride per l of resin.

Comparative Example

Fluoride adsorption experiment on an aluminium-doped heterodisperse resin having a second substitution level=1.5

The comparative example was conducted analogously to Example 1 step f).

Resin specimen A (aluminium-doped chelate resin containing iminodiacetic acid groups):
first substitution level: n=0.78, second substitution level m=1.5.

The results are shown in Table 2:

TABLE 2

| Usable capacities (UC) of resin A: | |
|---|---|
| Resin specimen | UC (g of F per l of resin) |
| Resin specimen A (aluminium-doped chelate resin containing iminodiacetic acid groups): | 1.9 |

Results

Example 2 which has been added to Table 3 was produced analogously and the usable capacity was determined.

TABLE 3

| Usable capacities of the chelate resins from the examples | | | |
|---|---|---|---|
| | First substitution | Second substitution | UC [g F°/l resin] |
| Example 1 | 0.95 | 1.04 | 2.1 |
| Example 2 | 0.97 | 0.85 | 3.5 |
| Comparative example | 0.78 | 1.5 | 1.9 |

Analytical Methods

Determination of Amount of Basic Aminomethyl Groups in Aminomethylated Crosslinked Polystyrene Bead Polymer 100 ml of the aminomethylated bead polymer are agitated down in the tamp volumeter and subsequently washed with demineralized water into a glass column. 1000 ml of 2% by weight aqueous sodium hydroxide solution are passed through the column in the course of 1 hour and 40 minutes. Demineralized water is then passed through until 100 ml of eluate with added phenolphthalein have a consumption of 0.1 N (0.1 normal) hydrochloric acid of not more than 0.05 mi.

50 ml of this resin are admixed in a beaker with 50 ml of demineralized water and 100 ml of 1 N hydrochloric acid. The suspension is stirred for 30 minutes and then filled into a glass column. The liquid is drained off. A further 100 ml of 1 N hydrochloric acid are passed through the resin for 20 minutes. 200 ml of methanol are then passed through. All the eluates are collected and combined and titrated with 1N aqueous sodium hydroxide solution against methyl orange.

The number of aminomethyl groups in 1 litre of aminomethylated resin computes according to the following formula: (200−V)*20=mol of aminomethyl groups per litre of resin.

Determination of the Amount of Weakly Acidic Iminoacetic Acid Groups in the Chelate Resin and Determination of the Substitution Level of the Hydrogen Atoms in the Primary Amino Groups by Acetic Acid Group Second Substitution 100 ml of exchanger are introduced into a filter column and eluted with 500 ml of 3% by weight hydrochloric acid within 1.5 hours. The column is then washed with demineralized water until the eluate is neutral.

50 ml of resin are taken from the amount of resin remaining and introduced into a column. 0.1 N sodium hydroxide solution is filtered through the resin. The eluate is collected in a 250 ml volumetric flask in each case. This liquid is titrated with 1 N hydrochloric acid against methyl orange. 0.1 N sodium hydroxide solution is filtered through the resin until 250 ml of eluate have a consumption of 24.5 to 25 ml of 1 N hydrochloric acid. Once the test has ended, the volume of exchanger in Na form is determined.

Total capacity (TC)=(X*25−sum of V)−3 in mol/l of exchanger

X=number of eluate fractions
Sum of V=total consumption in ml of 1 N hydrochloric acid in the titration

What is claimed is:

1. A chelate resin consisting essentially of functional groups of the formula (I)

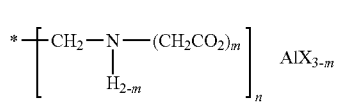

bonded to a polymer skeleton via the methylene group via an aromatic radical, wherein the polymer skeleton is a polystyrene copolymer and wherein X is any monovalent anion, n=0.60 to 1.20 per aromatic radical, and m=0.70 to 1.20 per nitrogen atom.

2. The chelate resin according to claim 1, wherein X is selected from the group of nitrate, chloride and bromide.

3. The chelate resin according to claim 1, wherein the chelate resin contains 25 to 35 g of aluminium per litre of resin.

4. The chelate resin according to claim 1, wherein:
the polystyrene copolymer has been prepared from styrene and polyvinylaromatic monomers;
wherein the polyvinylaromatic compounds comprise crosslinkers selected from the group consisting of divinylbenzene, divinyltoluene, trivinylbenzene, divinylnaphthalene, and trivinyinaphthalene; and
the polymer backbone comprises 1%-20% by weight of the polyvinylaromatic compounds, based on the sum total of monomers and crosslinkers.

5. The chelate resin according to claim 1, wherein:
X is selected from the group of nitrate, chloride and bromide; and
the chelate resin contains 25 to 35 g of aluminium per litre of resin.

6. The chelate resin according to claim 1, wherein n=0.70 to 1.0, and m=0.75 to 0.95.

7. A process for producing the chelate resin according to claim 1, the process comprising:
a.) converting monomer droplets composed of styrene, at least one polyvinylaromatic compound, at least one porogen, and at least one initiator to a crosslinked bead polymer,
b.) phthalimidomethylating the crosslinked bead polymer from step a) with phthalimide derivatives, wherein the phthalimide derivatives are used in this reaction in a ratio of 0.70 mol to 1.70 mol per mole of bead polymer,
c.) converting the phthalimidomethylated bead polymer from step b) to aminomethylated bead polymer,
d.) reacting the aminomethylated bead polymer from step c) with chloroacetic acid or salts thereof to give chelate resins having iminoacetic acid groups with m=0.70 to 1.20 and the molar ratio of chloroacetic acid or salts thereof is 0.70:1 to 1.40:1 based on the molar amount of the aminomethyl groups in the bead polymer, and
e.) contacting the chelate resin from step d) with a solution of AlX$_3$ where X is any monovalent anion.

8. The process according to claim 7, further comprising phthalimidomethylating at a temperature of 60° C. to 80° C.

9. The process according to claim 7, wherein the phthalimidomethylating comprises condensation of the phthalimide derivative with the bead polymer in the presence of a catalyst in a molar ratio of 0.1:1 to 0.45:1 in relation to the amount of phthalimide derivatives used.

10. The process for producing the chelate resin according claim 7, wherein the phthalimide derivatives are used in this reaction in a ratio of 0.70 mol to 1.35 mol per mole of bead polymer.

11. The process according to claim 7, wherein the amount of aluminium used in process step e) is 2 to 7 mol of aluminium based on one litre of chelate resin containing iminoacetic acid groups used.

12. The process for producing the chelate resin according to claim 7, wherein:
the at least one polyvinylaromatic compound is selected from the group consisting of divinylbenzene, divinyltoluene, trivinylbenzene, divinylnaphthalene, and trivinylnaphthalene; the at least one porogen is selected from the group consisting of hexane, octane, isooctane, isododecane, octanol, and isomers thereof; and the at least one initiator is selected from the group consisting of dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexanoate, 2,5-bis(2-ethylhexanoylperoxy)-2,5-dimethylhexane, tert-amylperoxy-2-ethylhexane, 2,2'-azobis(isobutyronitrile), and 2,2'-azobis(2-methylisobutyronitrile);
the phthalimidomethylating comprises condensation of the phthalimide derivative with the bead polymer in the presence of a catalyst selected from oleum, sulphuric acid or sulphur trioxide in a molar ratio of 0.2:1 to 0.4:1 in relation to the amount of phthalimide derivatives;

the phthalimidomethylating is done at a temperature of 60° C. to 80° C., and the phthalimide derivatives are used in this reaction in a ratio of 0.80 mol to 1.1 mol per mole of bead polymer;

the converting of the phthalimidomethylated bead polymer to aminomethylated bead polymer comprises treatment of the phthalimidomethylated bead polymer with aqueous or alcoholic solutions of sodium hydroxide or potassium hydroxide at temperatures of 120 to 190° C.;

the reacting of the aminomethylated bead polymer with chloroacetic acid or salts thereof is done at a molar ratio of the chloroacetic acid derivative to the bead polymer containing aminomethyl groups is 0.80:1.0 to 1.1:1.0, based on the molar amount of the aminomethyl groups in the bead polymer to provide a second substitution level of m=0.75 and 0.95; and the solution of $AlX_3$ is an aluminum salt solution selected from the group consisting of aluminium chloride, aluminium nitrate, aluminium sulphate, aluminium bromide, aluminium iodide, and the hydrates and solvates thereof, and the amount of aluminium used is 2 to 7 mol aluminium per litre of chelate resin containing iminoacetic acid groups.

13. A device for removing fluoride from water, the device comprising at least one chelate resin containing functional groups of the formula (I) according to claim 1.

14. Use of the device according to claim 13 for removing fluoride from water, preferably for producing drinking water.

\* \* \* \* \*